Sept. 20, 1966 V. H. KERNER 3,273,825
GUIDANCE SYSTEMS
Filed Oct. 30, 1961 2 Sheets-Sheet 1
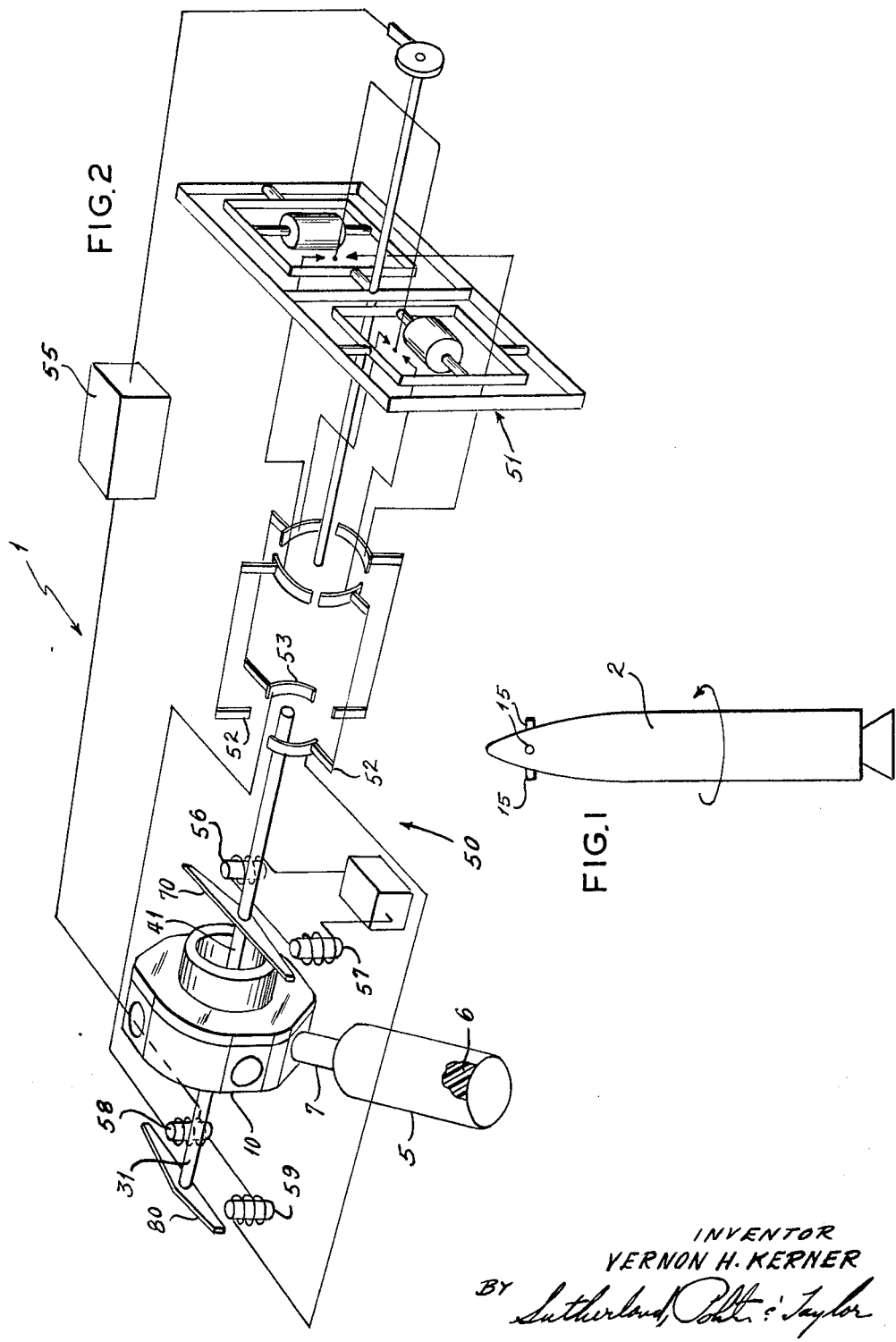
INVENTOR
VERNON H. KERNER
BY Sutherland, Pott & Taylor
ATTORNEYS.

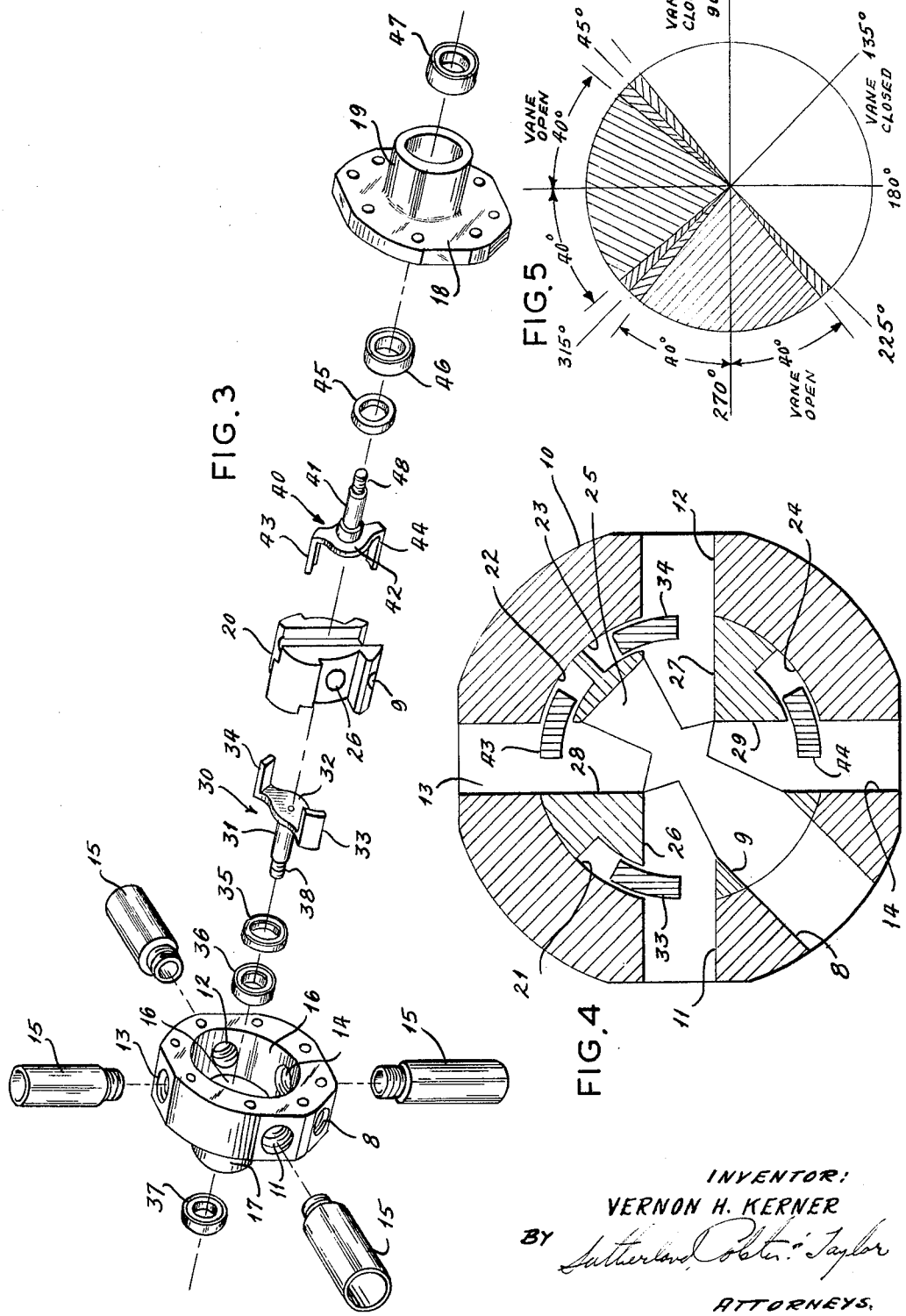

3,273,825
GUIDANCE SYSTEMS
Vernon H. Kerner, St. Louis County, Mo., assignor to Emerson Electric Co., a corporation of Missouri
Filed Oct. 30, 1961, Ser. No. 148,443
7 Claims. (Cl. 244—14)

This invention relates to guidance systems. It has particular application to missiles or aircraft the effectiveness of which depends upon maintaining as nearly as possible at every moment of their flight, a flight path or trajectory predetermined before their launching. Thus, the invention has application to rockets, particularly of the ballistic missile type, and to projectiles. These will be referred to collectively as "missiles", although the term is meant to embrace devices which have peaceful commercial and scientific, as well as military, uses.

Flight path control of missiles can be accomplished by the application of side thrust from jets acting at some angle to the missile axis. Side thrust may be, and is presently, obtained from numerous sources, such as liquid propellant systems, compressed gas release, or the release of viscous fluid or solid particles. While these systems are simple and flexible, because they can be turned on or off intermittently without danger to the system, they all suffer from one or more of the defects of excessive weight, sensitivity to the ambient temperature, or, most importantly, a short "shelf life".

One of the objects of this invention is to provide a guidance system which is safe, has a long shelf life, is immediately available for use, substantially unaffected by the ambient temperature, and can be operated independently of the main propulsion system of a missile.

Other objects will become apparent to those skilled in the art in the light of the following description and accompanying drawing.

In accordance with this invention, generally stated, a guidance system is provided in which a solid propellant supplies the motive power. One evident difficulty with the use of a solid propellant is that, once the propellant is ignited, it must proceed to burn-out at a substantially constant pressure. If the resultant gases are throttled back, the increased pressure caused by the throttling will increase the burning rate of the solid fuel, which, in turn increases the pressure. This cycle quickly leads to the explosion of the combustion chamber. On the other hand, if the gases are exhausted at too great a rate, the pressure in the combustion chamber drops to the point at which the propellant will not burn. In the system of this invention, the pressure within the combustion chamber or generator is maintained within the narrow critical limits required for stable operation. The uniform pressure is maintained by exhausting the gases from the generator through a plurality of ports, the total effective exhaust area which remains constant while the exhaust area of individual of the ports is varied.

In the simplest illustration of the principle of the guidance system of this invention, a generator containing a solid propellant is connected to communicate with a drumlike chamber, with two ports, located diametrically opposite one another, opening to the ambient atmosphere. Throttle means are provided for selectively blocking the ports, but in such a way that blocking of one port is accompanied by a corresponding opening of the other port. With this arrangement, the throttle means are normally biased to a position at which each of the ports is half closed. In this condition, it can be recognized that the radial forces exerted by the escape of gas from the generator through the ports, are exactly counterbalanced.

If, now, it is desired to exert a side thrust in one direction along the common axis of the ports, the throttle means are moved to block the port of the "leading" side of the drum with respect to the direction of force, and to open the opposite port. If the one port is completely blocked, the other port, being completely open, affords the same effective escape area as the two half-closed ports.

This simple illustration also points up another of the virtues of this device. It can be seen that leakage around the throttle means is of little importance, provided leakage is substantially the same in each port, since an equal flow of gas through each port will produce no resultant radial force on the axis of the chamber.

It can be seen that any number of ports or nozzles exhausting to the ambient atmosphere, may be used, provided that they are so oriented about the axis of the missile that, when an equal flow of gas is provided from each nozzle, their radial forces counterbalance one another. Thus, a three nozzle system, with the nozzles set radially, 120° apart, would be operative. The preferred embodiment uses four radially directed nozzles, set 90° apart. While it is simpler, and preferred, that the nozzles be directed radially, it is also practicable that the nozzles be directed at an angle intermediate the radial and tangential directions, so as to contribute a rotational force. They may even be oriented axially in such a way as to tend to accelerate or brake the missile in its flight.

Although the system of this invention is applicable to a non-rotating missile, normally, the device of this invention is applied to a missile which rotates about its flight axis, and means must be provided for opening the port through which a greater flow of exhaust gas is desired, through a predetermined limited arc of rotation, and then for biasing the throttle means to the neutral position for the portion of the travel of the ports through which no imbalancing force is to be exerted. For example, in the simple two port device given as an illustration, assuming that it is desired to exert a force tending to move the device horizontally to the right, if the vertical be taken as the reference point (0°), the right hand port might be closed as it travels from 50° to 130°, while the left hand port is opened wide as it travels between 230° and 310°. if the control device is such as to operate each of the ports as it comes into position, it can be seen that the ports will be in neutral position (assuming, for this purpose, that the opening and closing is instantaneous), for 200° in each revolution in which the sensing and control devices call for an imbalance in this direction. The terms, "horizontal" and "vertical" are used herein, in describing the preferred embodiment, as a matter of convenience to designate two axes at right angles to one another, but it can be seen that the reference (0°) position can have any desired pre-set angular relation to the earth.

In the preferred embodiment, the throttle means associated with one of the pairs of oppositely disposed ports is controlled by a vertical deviation sensing means, and the throttle means for the other pair of ports is controlled by a horizontal deviation sensing means. The sensing and throttle means for one of the pair of ports are independent of those for the other pair of ports, so that, in a system in which the effective exhaust area is metered in accordance with the amount of imbalance desired, the resultant corrective force may be directed at any desired angle. If the system is a simple, on-off (fully closed and opened-neutral) system a vertical, horizontal or midway intermediate resultant force can be applied, depending upon the operation of the controls.

In the simple two-port device described by way of illustration of the principles involved in this invention, the ports through which the gases exhaust to the atmosphere serve both as vent nozzles and gas-flow control ports. It can be seen that these functions can be separated. Thus, if an interior manifold is used, the nozzles which are oriented so as to cancel the radial forces exerted by an equal flow of gas through each, can be open wide at all times, and the flow of gas can be controlled by varying the effective exhaust area of individual internal ports, communicating with the nozzles but not necessarily oriented in exactly the same way. In this case, the total effective area of the internal ports must remain substantially constant.

In the description and claims, the term "hollow shell" refers to the gas-receiving device through which the flow of gas is directed selectively to nozzles opening to the ambient atmosphere. It thus may be a casing or a manifold, with the throttle means internally or externally disposed with respect to it, and it may or may not have ports which serve as nozzles or which are oriented as if they were nozzles. The term "nozzles" is used broadly to indicate the opening defining means through which the gases are vented to the ambient atmosphere. They may be venturi tubes or merely holes in a simple shell.

In the drawing, FIGURE 1 is a somewhat diagrammatic view in side elevation of a ballistic missle equipped with a guidance system of this invention;

FIGURE 2 is a diagrammatic view in perspective of one embodiment of guidance system of this invention and control therefor;

FIGURE 3 is an exploded view in perspective of one embodiment of guidance system of this invention, without its control mechanism;

FIGURE 4 is a sectional view, looking from the base toward the nose of the missile shown in FIGURE 1, of the assembled valve of the guidance system shown in FIGURE 3; and FIGURE 5 is a graph illustrating the action of valve vanes in the valve shown in FIGURE 4, viewed in the same direction as the valve in FIGURE 4.

Referring now to the drawing and particularly to FIGURES 2, 3 and 4 for one illustrative embodiment of the guidance system of this invention, reference numeral 1 indicates a complete system, which, as indicated in FIGURE 1, may be located in the nose section of a rocket 2 of the ballistic missile type.

The system 1 includes a generator 5, containing a solid propellant 6; a casing or body 10; a hollow shell, which, in this embodiment, is in the form of a manifold 20; horizontal throttle means 30; vertical throttle means 40, and a control system 50. The propellant 6 is of the standard variety which burns at a uniform rate at a known constant pressure.

In this illustrative embodiment, the generator 5 communicates with the interior of the body 10 through a pipe 7, connected to a body gas inlet port 8, which in turn communicates with a manifold gas inlet port 9.

In the embodiment shown, the body cavity is closed on one axial end by an integral wall 16, provided with a bearing hub 17, and on the other axial end by an end plate 18, provided with a bearing hub 19, and mounted on the body by means of studs taking into the heavy circumferential wall of the body. The inner surface of the body cavity-defining circumferential wall is cylindrical, concentric with respect to the centers of the bearing hubs 17 and 19.

Horizontal body ports 11 and 12, and vertical body ports 13 and 14 extend radially through the circumferential body wall. Nozzles 15 are threadedly secured in ports 11–14, and communicate with the ambient atmosphere.

The manifold 20 is press fit, or otherwise secured, within the body 10. The exterior radial surfaces of the manifold are so formed as to define, with the integral wall 16, an axial space to accommodate a yoke portion of the horizontal throttle means 30, and with the end plate 18, an axial space to accommodate a portion of the vertical throttle means 40. Around parts of its perimeter, the manifold is cut away radially cylindrically on the same center as the inner surface of the circumferential body wall so as to provide, with the inner body wall, vane-accommodating chambers 21, 22, 23 and 24. Internally, the manifold is bored or milled out, to provide, besides the gas inlet passage 9, a plenum chamber 25, and manifold ports 26, 27, 28 and 29, corresponding to and communicating with body ports 11, 12, 13 and 14 respectively.

In the embodiment shown in FIGURE 3, the horizontal throttle means consists of a shaft 31 on the inner end of which is a yoke 32, defining an annular flange with respect to the shaft, and carrying a pair of axially directed vanes 33 and 34. Both the inner and outer surfaces of the vanes 33 and 34 are formed as arcs of a circle on a radius intermediate that of the inner surface of the body 10 and the outer circumferential surface of the radially cut away portions of the manifold 20, and on the same center as that of the shaft, manifold and body. However, as can be seen most clearly from FIGURE 4, only one edge of each of the vanes 33 and 34 is diametrically opposite the other so that both of the vanes 33 and 34 are entirely on one side of a diameter common to the two edges. The vane 33 moves freely into and out of the chamber 21; the vane 34 moves freely into and out of the chamber 23.

The shaft 31 extends through a graphite seal 35, which butts against the yoke 32, through an inner bearing 36 and an outer bearing 37 mounted in the hub 17, and projects exteriorly of the hub 17. The shaft is provided at its outer end with a threaded section 38.

The vertical throttle means 40, corresponds in structure to the horizontal throttle means 30, with a shaft 41, yoke 42 and vanes 43 and 44. The vanes 43 and 44 move into and out of chambers 22 and 24 respectively. Like the vanes 33 and 34, the vanes 43 and 44 are diametrically opposite only along one edge, and are otherwise, with respect to the diameter defined by that edge, entirely on one side of the diameter. The shaft 41 projects through a graphite seal 45, which abuts the outer radial face of the yoke 42, through an inner bearing 46 and outer bearing 47 mounted in the hub 19 of the end plate 18, and exteriorly of the hub 19. The projecting outer end of the shaft 41 is provided with a threaded section 48.

The control system 50 illustrated in FIGURE 2, is shown diagrammatically. Gyroscope systems for detecting deviation from a reference platform, either horizontal or vertical, or both, are well known to the guidance system art. The gyroscope platform is mounted to remain fixed in two directions with respect to the earth while the rest of the guidance system (generator, body, and throttle means), which are fixed with respect to the missile, rotate with respect to the earth and to the gyroscope system. In the simple system which is also the preferred embodiment, a gyro system 51 senses deviation from the desired path, and determines in which sector correction is required. This information, in the form of current, is transferred to brushes 52, fixed with respect to the gyro system, which bear on commutators 53 which are fixed with respect to the rocket, hence rotate with respect to the brushes when the rocket is rotating.

In response to the brush-commutator signal, current is provided from a power source 55 to solenoids 56, 57, 58 and 59, selectively. As shown in FIGURE 2, the solenoids 56 and 57 are on opposite ends of a vertical throttle torque bar 70, rigidly mounted on the threaded end of the vertical throttle means shaft 41. The solenoids 58 and 59 are at opposite ends of a horizontal throttle torque bar 80, rigidly mounted on the threaded end 38 of the shaft 31 of the horizontal throttle means.

The unlabelled box shown in FIGURE 2 as connected to solenoids 56 and 57 represents a dither source, an alternating potential of small magnitude which provides a small oscillation of the vanes to prevent any build up of any residue from hot gases during periods of inactivity of the vanes. What has been represented as a series connection of the solenoids is in reality a common line to utilize the same power source. The circuit is completed to each solenoid independently through the commutator and thus to the other terminal of power source 55. The circuit is completed through the switches on the gyro.

In operation, it can be seen by looking at FIGURE 4, that rotation of the shaft 31 in either direction will cause one of the vanes 33 and 34 to block or open its respective passage by exactly the amount which the other vane opens or blocks its passage. The same is true of the vanes 43 and 44. Thus, the total effective area for exhaust of gases from the generator remains the same no matter in what direction of rotation the vanes are moved. In this embodiment, both the manifold ports and the body ports are part of the throttling system, since the clearance between the vanes and the external surface of the manifold, and the vanes and the internal surface of the body is substantially the same. In this respect, both are ports, as opposed to nozzles, as those terms are used herein. If the body itself were so arranged that the body ports served merely as outlets, and had no part in the throttling they would become nozzles as the term is used herein.

Merely for the sake of illustration, but not by way of limitation, assume that the missile is rotating at the rate of four revolutions per second. Solenoids are presently being used in conjunction with the system of this invention, which act in ten milliseconds to move one of the torque bars, hence the vanes, from neutral to fully opened (and closed) position. In this length of time, the missile will have rotated through about 5°. The commutator-brush arrangement can easily be set to actuate the solenoids at any position of the rocket relative to the gyro platform. Preferably, in this illustration, the system is set in such a way that in applying correction to the right, as viewed in FIGURE 5, assuming the missile to be rotating as indicated in FIGURE 1, and the passage 11 to be in the 180° position, the vane 33 will begin to move into the chamber 21 as the passage 11 reaches the 225° position and simultaneously the vane 34 will begin to move out of the chamber 23 and into the remainder of the passages 12 and 27 which are at the 45° position, reckoned from the vertical as zero. The vanes will be in their extreme open and closed position by the time the passage 11 has reached the 230° position and the passage 12, the 50° position, and will remain so until they reach the 310°–130° position, when the solenoid will be de-energized, and the vanes be restored to their neutral position. The restoring means, which are not here shown, may be in the form of springs, or any other suitable means, such being well known in the art. It is desirable that these restoring means have similar reaction characteristics to those of the solenoids to keep the pattern symmetrical. In response to a signal that a left-hand correction is needed, the opening and closing will be reversed, but the arcs of travel and opening and closing patterns will be the same.

The opening and closing patterns for the vertical throttle means will be the same as those of the horizontal throttle means, displaced 90°, i.e., in a downward correction, as viewed in FIGURES 4 and 5, the vane 43 starts its move into the chamber 22, while the vane 44 will start completely to block the passage 29–14, when the port 13 is at the 315° position, vane 43 opening (and vane 44 closing) completely by the 320°–140° position and being restored to neutral in the 40 to 45° —220 to 225° position.

It can be seen that if the horizontal and vertical throttle vanes are moved at the same time, through the entire sweep of their respective controlling commutators, the resultant effective force vector will be midway between the vertical and horizontal. However, even in the on-off system described, in which there is no metering in the sense of a partial closing or opening in response to a slight deviation, there may still be a correction such that the resultant vector is not simply either vertical or horizontal or halfway between. If the brush signal is received, for example, when the commutator is halfway through its brush engaging interval, the corrective force will not be symmetrical with respect to the vertical and horizontal axes, and the resultant force vector will lie at some intermediate point different from the halfway point. If it is desired to minimize this possibility, the arc through which the control device acts to open or shut passages may be made very short or the device may be arranged to actuate the vanes through the full commutator sweep or not at all. It may also be determined to be desirable to increase the number of ports, so as to increase the frequency at which ports are in a position to exert the desired imbalance.

It can be seen that the vertical and horizontal throttle means may perform double service, e.g., the vertical throttle vanes can be utilized as horizontal throttle vanes when they have rotated through 90° from the initial vertical actuation point.

When an odd number of equal sized ports is used, such, for example, as three, it is no longer possible to provide a simple balanced vane arrangement to accomplish the uniform flow of gas. However six ports can be arranged in pairs clustered on 120° centers, using balanced paired vanes, if it is so desired.

Numerous other variations in the construction of the guidance system of this invention, within the scope of the appended claims, will be apparent to those skilled in the art in the light of the foregoing disclosure.

Having thus described the invention, what is claimed and desired to be secured by Letters Patent is:

1. A guidance system adapted for use with a source of gas independent of the main propulsion system of a missile, comprising a hollow shell in the form of a manifold the interior of which communicates with said source of gas, said manifold having a plurality of ports therethrough through which said gas can escape; throttle means adjacent and associated with said manifold, for selectively blocking ports in said manifold; a hollow body having paired nozzles, the nozzles in a pair being directed in diametrically opposite directions from one another and said nozzles communicating discretely with one of said manifold ports arranged to be selectively blocked by said throttle means, said throttle means being positioned between said manifold ports and said nozzles, and power means connected to move said throttle means with respect to said ports in such a way that restriction of the effective area of a port communicating with one nozzle of a pair is accompanied by expansion of the effective area of a port communicating with the other nozzle of the pair, whereby the total effective gas escape area of the ports, hence the total flow of gas, remains constant, and the radial forces produced by an equal flow of gas from the nozzles of a pair are cancelled.

2. The guidance system of claim 1 wherein the manifold ports extend radially and open into a surface which in section is is an arc of a circle, and the throttle means comprise a pair of vanes, movable about the central axis of said circle, said vanes being mounted on a shaft the axis of which is co-incident with the said central axis of said circle, said vanes being located on the same side of a diameter of said circle, and said power means are connected to rotate said shaft.

3. The guidance system of claim 2 wherein two pairs of nozzles, four manifold ports and two sets of vanes are provided, said nozzles being positioned at four quadrants, and said vanes being mounted in pairs on two separately rotatable shafts.

4. The device of claim 1 where the device is mounted in an aircraft rotating about an axis and the power means operates from a predetermined base of reference to equalize the effective gas escape area of paired ports through a fixed predetermined arc of rotation of said aircraft.

5. The guidance system of claim 1 wherein the throttle means are normally biased to a position at which an equal amount of gas is projected from all the nozzles.

6. A solid propellant-powered guidance system mounted in a rotating missile and designed to counter a tendency of the missile to precess or wobble, comprising, a solid propellant container; a solid propellant within said container, said solid propellant being of the type which burns at a substantially uniform rate at a constant pressure; a hollow shell in the form of a manifold the interior of which communicates with said solid propellant container, whereby gases produced by the burning of said solid propellent enter said manifold, said manifold having a plurality of ports therethrough through which said gases escape; throttle means associated with said manifold for selectively blocking ports; a hollow body surrounding said manifold and having nozzles communicating with the ambient atmosphere and with the interior of said body, said nozzles being oriented about the axis of rotation in such a manner that radial forces produced by an equal flow of gas from said nozzles are canceled, and power means connected to move said throttle means with respect to said ports in such a way that restriction of the effective area of one port is accompanied by expansion of the effective area of a companion port, whereby the total effective gas escape area of the ports, hence the total flow of gas, remains constant.

7. The system of claim 6 wherein the manifold has a cylindrical external surface and the throttle means comprise arcuate vanes, curved complementarily to the cylindrical surface and mounted on a shaft having an axis common to the long axis of the cylindrical surface, and the power means are connected to rotate said shaft.

References Cited by the Examiner

UNITED STATES PATENTS

| | | | |
|---|---|---|---|
| 2,654,334 | 10/1953 | Wheeler | 114—23 |
| 2,822,755 | 2/1958 | Edwards | 244—14 X |
| 2,974,594 | 3/1961 | Boehm | 343—100 |
| 2,995,894 | 8/1961 | Baxter et al. | 60—35.54 |

BENJAMIN A. BORCHELT, *Primary Examiner.*

CHESTER L. JUSTUS, SAMUEL FEINBERG,
*Examiners.*

P. M. HINDERSTEIN, T. A. ROBINSON, W. C. ROCH,
*Assistant Examiners.*